UNITED STATES PATENT OFFICE 1,999,576

PRODUCTION OF GLYOXALS

Harry Lister Riley, South Kensington, London, England, assignor to Imperial Chemical Industries Limited, a corporation of Great Britain No Drawing. Application March 26, 1932, Serial No. 601,459. In Great Britain April 8, 1931

19 Claims. (Cl. 260—138)

This invention relates to oxidation compounds of olefine hydrocarbons and a process for the manufacture thereof.

It is an object of the invention to produce compounds containing the grouping

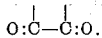

A further object is the provision of a new and improved process for producing compounds of the above described character. Further objects are the provision of a new process for oxidizing unsaturated hydrocarbons, and the production of glyoxal and derivatives thereof from compounds containing the grouping

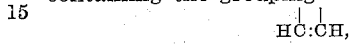

more particularly ethylene, propylene, and the like. Other objects will appear hereinafter.

These objects are accomplished according to the invention whereby compounds having the general formula

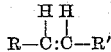

in which R and R' represent hydrogen or alkyl groups, are treated with selenium dioxide or selenious acid. In this manner, compounds containing the grouping

are converted into compounds containing the grouping

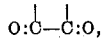

which may be recovered from the reaction product in any suitable manner. Thus, when gaseous ethylene is passed over selenium dioxide at temperatures between 50° C. and 300° C., a reaction takes place which may be represented by the following equation

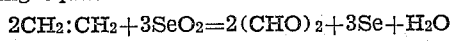

the ethylene being oxidized to glyoxal. The glyoxal may be obtained as such, or as the solid polymer (CHO·CHO)n.

While the invention is susceptible of considerable variation and modification in the manner of its practical application, particularly as regards the proportions of materials and the exact method of procedure, the following example will serve to illustrate how it may be practiced.

Example

Dry ethylene in excess of the stoichiometric proportions set forth in the above equation, is passed over 50 parts of selenium dioxide preferably at a temperature rising to about 250° C. to permit liquefaction of the selenium formed. The interaction being complete the cooled mixture of selenium and glyoxal polymer is extracted with water. The aqueous extract is treated with sulphur dioxide to precipitate any selenious acid present as selenium. After filtration an aqueous solution of 8.5 parts of glyoxal is obtained.

The extraction may also be carried out by the use of organic solvents such as, for example, acetic anhydride or methyl alcohol.

When propylene is treated with selenium dioxide methyl glyoxal or its polymeride (cf. e. g. Richter-Anschutz, Chemie der Kohlenstoffverbindungen, 12th edition, 1298, vol. 1, page 439) is similarly obtained.

It will be understood that the invention is applicable to the treatment of any compound having the general formula

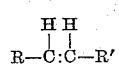

in which R and R' represent hydrogen or alkyl groups. The application of the invention to the following specific compounds, in which R represents hydrogen and R' represents hydrogen or an alkyl group, merits special mention: ethylene, propylene, normal (or alpha)-butylene, iso (or gamma)-butylene, and the amylenes (both normal and iso). Of the compounds in which R and R' both represent alkyl groups, mention may be made of beta-butylene (CH₃—CH:CH—CH₃), beta-iso-amylene

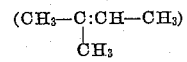

and the like compounds.

The unsaturated hydrocarbon employed in the reaction should preferably be in gaseous form and the amount thereof, while not limited to any particular proportions, should preferably be at least sufficient to react with all of the oxygen in the selenium-oxygen compound.

While the temperature of the reaction may vary within relatively wide limits, generally speaking, it is preferable to employ temperatures below about 350° C. Especially desirable results are obtained when the temperature of the reaction is within the range of about 50–300° C.

The pressure is also subject to considerable variation and either normal or elevated pressures may be employed. However, since the reaction is preferably effected with the unsaturated hydrocarbon in gaseous phase, it will be apparent that the pressure should preferably be below the pressure at which the unsaturated hydrocarbon liquefies under the temperature conditions involved.

As many apparent and widely different embodiments of this invention may be made without departing from the spirit thereof, it is to be understood that I do not limit myself to the foregoing examples or description except as indicated in the following claims.

I claim:

1. A process of oxidizing ethylene compounds of the formula R—CH:CH—R', where R and R' represent hydrogen or alkyl groups, by heating them with selenium dioxide.

2. The process of producing glyoxals which comprises heating compounds of the general formula R—CH:CH—R', in which R and R' represent hydrogen or alkyl groups, with selenious acid.

3. A process of producing glyoxals which comprises heating gaseous compounds of the general formula R—CH:CH—R', in which R and R' represent hydrogen or an alkyl group, with selenium dioxide.

4. A process of producing a glyoxal which comprises heating ethylene with selenium dioxide.

5. A process of producing a glyoxal which comprises heating compounds of the general formula R—CH:CH—R' in which R represents hydrogen and R' represents an alkyl group with selenium dioxide.

6. A process of producing a glyoxal which comprises heating ethylene with selenium dioxide at a temperature within the range of about 50° C. to about 300° C.

7. A process of producing a glyoxal which comprises heating ethylene with selenium dioxide at a temperature of about 250° C.

8. A process of producing an aldehydic compound which comprises heating a compound of the general formula

R—CH:CH—R' in which R and R' represent hydrogen or alkyl groups with an inorganic compound containing a selenium-oxygen linkage and capable of decomposing when heated to form selenium dioxide.

9. A process of producing a glyoxal which comprises heating a compound of the general formula

R—CH:CH—R' in which R represents hydrogen and R' represents an alkyl group with an inorganic compound containing a selenium-oxygen linkage and capable of decomposing when heated to form selenium dioxide.

10. A process of producing a glyoxal which comprises heating compounds of the general formula

R—CH:CH—R' in which R represents hydrogen and R' represents hydrogen or a methyl group with an inorganic compound containing a selenium-oxygen linkage which decomposes under the influence of heat to form selenium dioxide.

11. The process of producing a glyoxal which comprises heating ethylene with selenious acid.

12. The process of producing a glyoxal which comprises heating propylene with selenium dioxide.

13. The process of producing a glyoxal which comprises heating propylene with selenious acid.

14. The process of producing a glyoxal which comprises heating ethylene with an inorganic compound containing a selenium-oxygen linkage which decomposes under the influence of heat to form selenium dioxide, and maintaining the reaction temperature above the melting point of selenium.

15. The process of producing a glyoxal which comprises heating ethylene with an inorganic compound containing a selenium-oxygen linkage which decomposes under the influence of heat to form selenium dioxide, and maintaining the reaction temperature above the melting point of selenium but below about 350° C.

16. The process of producing a glyoxal which comprises heating ethylene with an inorganic compound containing a selenium-oxygen linkage which decomposes under the influence of heat to form selenium dioxide, and effecting reaction at a temperature of about 250° C.

17. The process of producing a compound of the general formula R—CO—CO—R', wherein R and R' individually stand for hydrogen or an alkyl group, which comprises passing a compound of the general formula R—CH=CH—R', wherein R and R' have the same significance as above, in gaseous form over heated selenium dioxide.

18. The process of producing a compound of the general formula R—CO—CO—R', wherein R and R' individually stand for hydrogen or an alkyl group, which comprises passing a compound of the general formula R—CH=CH—R', wherein R and R' have the same significance as above, in gaseous form over heated selenious acid.

19. The process of producing a compound of the general formula R—CO—CO—R', wherein R and R' individually stand for hydrogen or an alkyl group, which comprises passing a compound of the general formula R—CH=CH—R', wherein R and R' have the same significance as above, in gaseous form and at elevated temperature over a compound selected from the group consisting of selenium dioxide and compounds which form selenium dioxide at elevated temperature.

HARRY LISTER RILEY.